United States Patent
Chae et al.

(10) Patent No.: US 11,722,262 B2
(45) Date of Patent: Aug. 8, 2023

(54) METHOD AND APPARATUS FOR TRANSMITTING FEEDBACK BY TERMINAL RECEIVING SIGNAL FROM ANOTHER TERMINAL IN WIRELESS COMMUNICATION SYSTEM

(71) Applicant: LG Electronics Inc., Seoul (KR)

(72) Inventors: Hyukjin Chae, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/632,808

(22) PCT Filed: Jul. 20, 2018

(86) PCT No.: PCT/KR2018/008235
§ 371 (c)(1),
(2) Date: Jan. 21, 2020

(87) PCT Pub. No.: WO2019/017733
PCT Pub. Date: Jan. 24, 2019

(65) Prior Publication Data
US 2021/0160015 A1  May 27, 2021

Related U.S. Application Data

(60) Provisional application No. 62/535,294, filed on Jul. 21, 2017.

(51) Int. Cl.
*H04L 1/1829* (2023.01)
*H04L 1/1607* (2023.01)

(52) U.S. Cl.
CPC .......... *H04L 1/1854* (2013.01); *H04L 1/1664* (2013.01); *H04L 1/1678* (2013.01)

(58) Field of Classification Search
None
See application file for complete search history.

(56) References Cited

U.S. PATENT DOCUMENTS 9,125,153 B2 * 9/2015 Aggarwal ........... H04W 56/009
2003/0016655 A1 * 1/2003 Gwon ................. H04W 36/125
370/352

(Continued)

FOREIGN PATENT DOCUMENTS

CN  103517276  1/2014
CN  104145443  11/2014

(Continued)

OTHER PUBLICATIONS

EP Extended European Search Report in European Appln. No. 18835657.0, dated Feb. 11, 2021, 8 pages.

(Continued)

*Primary Examiner* — Lonnie V Sweet
(74) *Attorney, Agent, or Firm* — Fish & Richardson P.C.

(57) ABSTRACT

One embodiment of the present invention relates to a method for transmitting, by a terminal, feedback on a signal from another terminal in a wireless communication system. The method for transmitting feedback information comprises the steps of: receiving signals transmitted by a plurality of terminals; and transmitting feedback information on each of at least parts of the received signals, wherein the feedback information is transmitted together with data of the terminal transmitting the feedback information, and the feedback information includes time information that allows the terminals that transmitted each of the parts of signals that are subject to the feedback to recognize that the feedback information is feedback on the signals transmitted by the same terminals. The UE is capable of communicating with (Continued)

at least one of another UE, a UE related to an autonomous driving vehicle, the BS or a network.

8 Claims, 14 Drawing Sheets

(56) References Cited

U.S. PATENT DOCUMENTS

| | | | |
|---|---|---|---|
| 2005/0050018 A1* | 3/2005 | Basso | G06F 16/20 |
| 2008/0188264 A1* | 8/2008 | Duan | H04L 1/1642 |
| | | | 455/561 |
| 2011/0299399 A1* | 12/2011 | Egan | H04L 47/193 |
| | | | 370/237 |
| 2013/0225184 A1 | 8/2013 | Liu et al. | |
| 2014/0010175 A1* | 1/2014 | Chiu | H04W 72/042 |
| | | | 370/329 |
| 2015/0163790 A1 | 6/2015 | Lee et al. | |
| 2016/0095133 A1 | 3/2016 | Hwang et al. | |
| 2016/0381666 A1 | 12/2016 | Kim et al. | |
| 2017/0048050 A1 | 2/2017 | Fujishiro et al. | |
| 2017/0208577 A1 | 7/2017 | Novak et al. | |
| 2017/0347394 A1* | 11/2017 | Yasukawa | H04L 1/1896 |
| 2018/0063799 A1* | 3/2018 | Sadek | H04W 74/0808 |
| 2019/0029029 A1* | 1/2019 | Ohtsuji | H04L 5/00 |
| 2019/0165890 A1* | 5/2019 | Pietraski | H04B 7/0617 |
| 2020/0296749 A1* | 9/2020 | Freda | H04W 72/1278 |

FOREIGN PATENT DOCUMENTS

| | | |
|---|---|---|
| CN | 105553612 | 5/2016 |
| CN | 106165318 | 11/2016 |
| CN | 106470387 | 3/2017 |
| CN | 106537814 | 3/2017 |
| CN | 106612558 | 5/2017 |
| JP | 2015-506634 | 3/2015 |
| JP | 2016086406 | 5/2016 |
| WO | WO2013183727 | 12/2013 |
| WO | WO 2015/029954 | 3/2015 |
| WO | WO2016076301 | 5/2016 |
| WO | WO 2017/026409 | 2/2017 |
| WO | WO2017092790 | 6/2017 |
| WO | WO2016076301 | 8/2017 |

OTHER PUBLICATIONS

JP Office Action in Japanese Appln. No. 2020-502594, dated Feb. 2, 2021, 7 pages (with English translation).

PCT International Search Report and Written Opinion in International Application No. PCT/KR2018/008235, dated Nov. 9, 2018, 24 pages (with English translation).

Office Action in Chinese Appln. No. 201880059736.2, dated Feb. 16, 2022, 14 pages (with English translation).

Intel Corporation, "Analysis of Mutual Impact of WAN and D2D Communication," R1-142019, Presented at 3GPP TSG RAN WG1 Meeting #77, Seoul, Korea, May 19-23, 2014, 7 pages.

Office Action in Chinese Appln. No. 201880059736.2, dated Dec. 6, 2022, 16 pages (with English translation).

JP Office Action in Japanese Appln. No. 2022-010078, dated Feb. 14, 2023, 10 pages (with English translation).

* cited by examiner (a)

(b)

(a)

(b)

(a)

(b)

METHOD AND APPARATUS FOR TRANSMITTING FEEDBACK BY TERMINAL RECEIVING SIGNAL FROM ANOTHER TERMINAL IN WIRELESS COMMUNICATION SYSTEM

CROSS-REFERENCE TO RELATED APPLICATIONS

This application is a National Stage application under 35 U.S.C. § 371 of International Application No. PCT/KR2018/008235, filed on Jul. 20, 2018, which claims the benefit of U.S. Provisional Application No. 62/535,294, filed on Jul. 21, 2017. The disclosures of the prior applications are incorporated by reference in their entirety.

TECHNICAL FIELD

The present disclosure relates to a wireless communication system, and more particularly, to a method and apparatus for transmitting a feedback for a signal received from another user equipment (UE) by a UE in vehicle-to-everything (V2X).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An aspect of the present disclosure is to provide a method of transmitting a feedback signal for signals received from other user equipments (UEs) to the UEs by a UE.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of transmitting a feedback for a signal from another user equipment (UE) by a UE in a wireless communication system includes receiving signals from a plurality of UEs, and transmitting feedback information for each of at least a part of the received signals. The feedback information is transmitted along with data of the UE transmitting the feedback information. The feedback information includes time information for enabling a UE transmitting each of the at least part of the received signals, for which the feedback information is transmitted, to identify that the feedback information is for the signal transmitted by the UE.

According to an embodiment of the present disclosure, A UE for transmitting a feedback for a signal from another UE in a wireless communication system includes a transceiver and a processor. The processor is configured to receive signals from a plurality of UEs and transmit feedback information for each of at least a part of the received signals. The feedback information is transmitted along with data of the UE transmitting the feedback information. The feedback information includes time information for enabling a UE transmitting each of the at least part of the received signals, for which the feedback information is transmitted, to identify that the feedback information is for the signal transmitted by the UE.

The time information may be for the number of preceding time units the signal was transmitted from a time unit carrying the feedback information.

A time unit carrying the feedback information may be located within a maximum time period from a time unit carrying the signal for which the feedback information is transmitted.

The maximum time period may be set differently according to a packet type.

The maximum time period may be set differently according to a latency requirement of a packet.

When two or more of the plurality of UEs transmit signals in different layers at an overlapped time to the UE, the feedback information may include information related to identifies (IDs) of the two or more UEs.

The information related to the IDs of the two or more UEs may be included in the signals transmitted by the two or more UEs.

Advantageous Effects

According to the present disclosure, a feedback signal may be transmitted efficiently, while packet reception ratio (PRR) reduction is prevented in vehicle-to-everything (V2X).

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings.

BEST MODE

Figure 1:
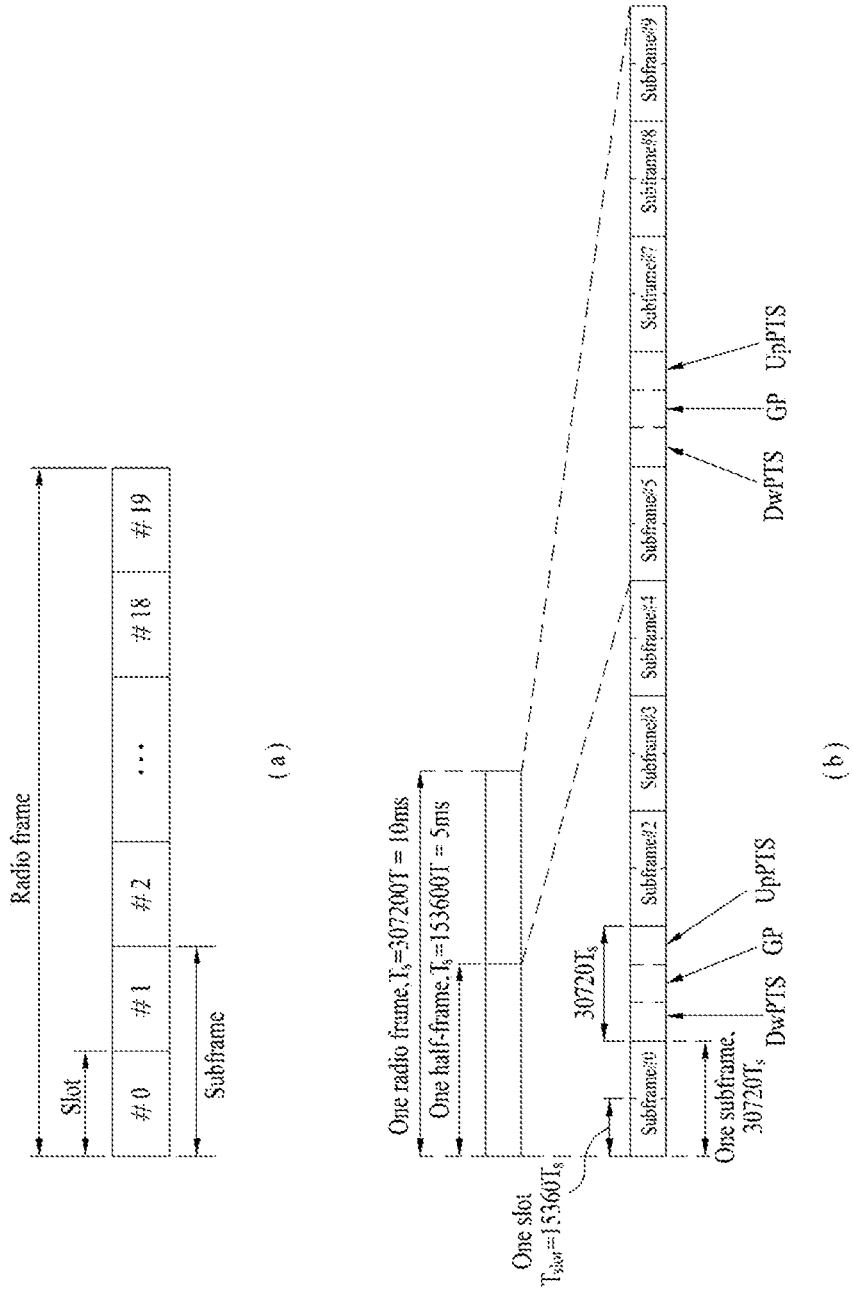
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(*a*) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(*b*) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
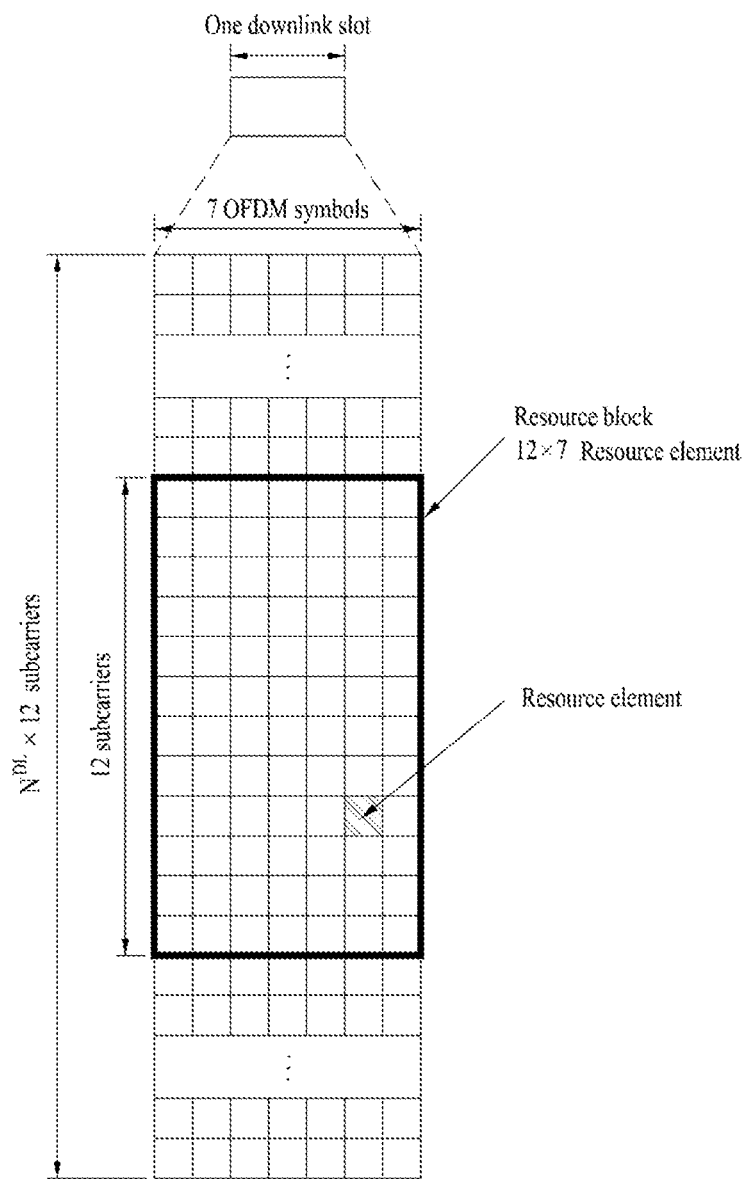
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
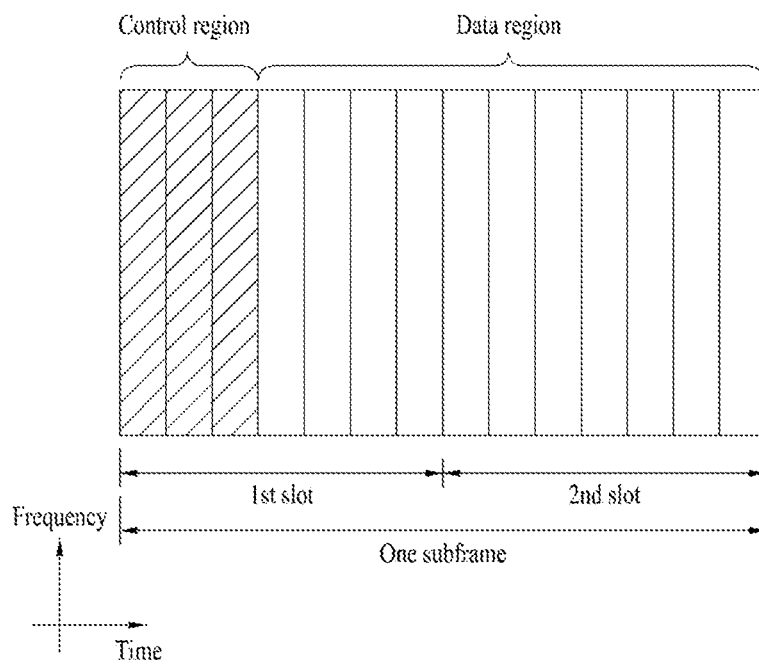
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARM) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
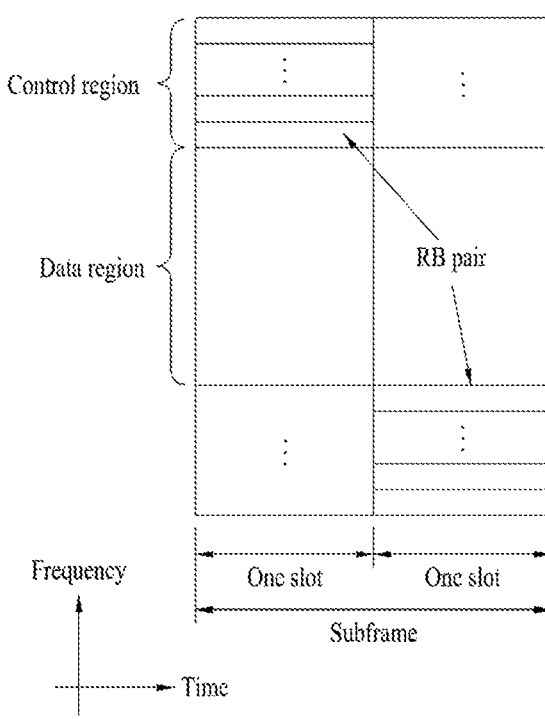
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
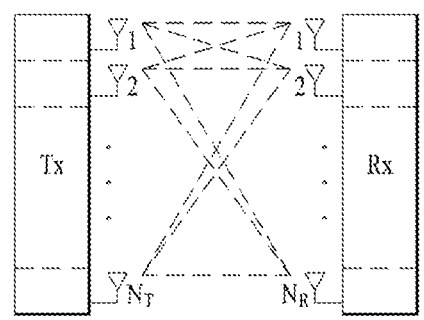
FIG. 5 is a view illustrating the configuration of a wireless communication system having multiple antennas.
Figure 5:
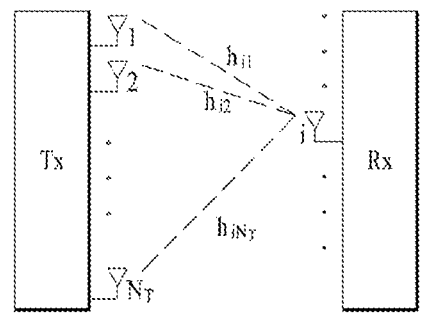

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y=[y_1,y_2,\ldots,y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T=[h_{i1},h_{i2},\ldots,h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots n_{N_R}$ respectively added to the $N_R$ Rx antennas can be expressed as follows.

$$n=[n_1,n_2,\ldots,n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \quad \text{[Equation 10]}$$

$$\begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T,N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
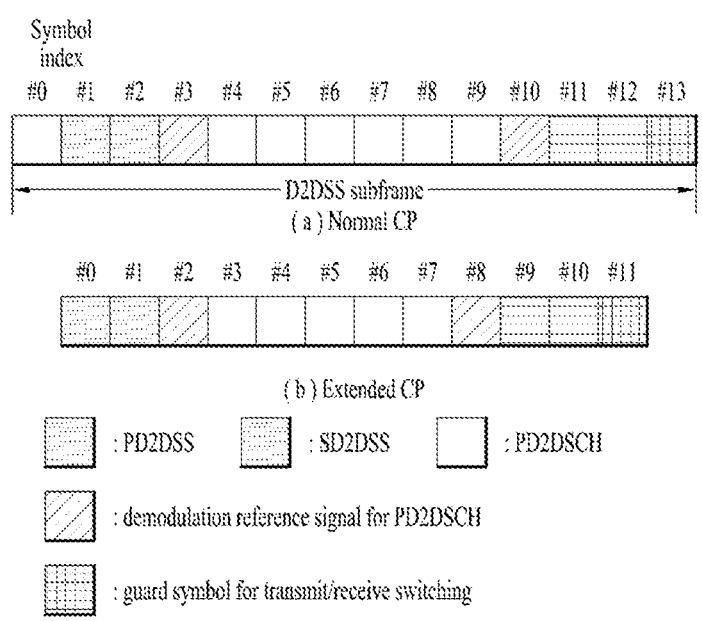
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
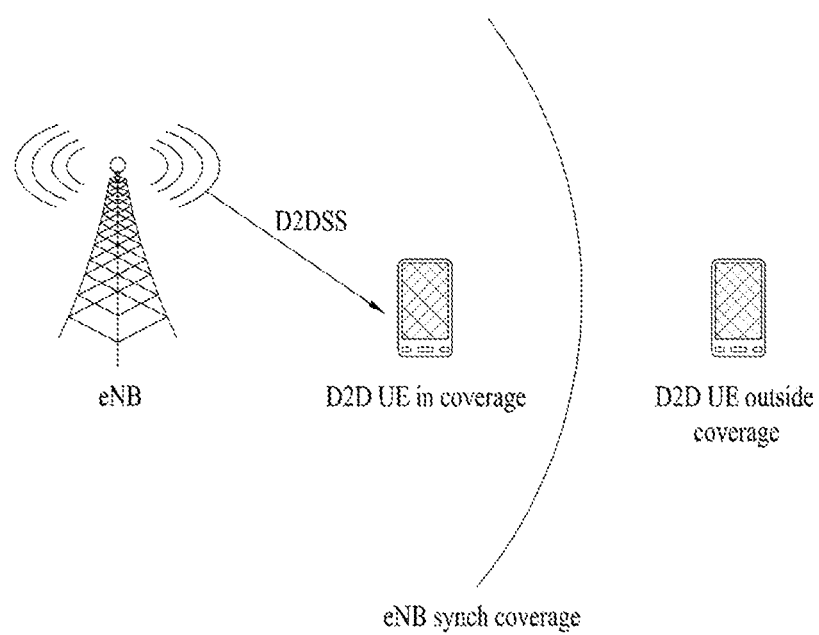
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
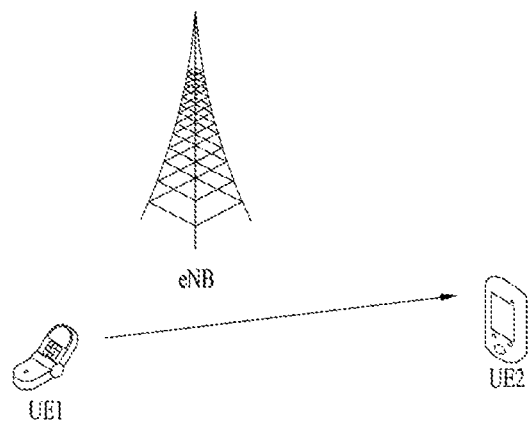
FIG. 8 is a view illustrating an exemplary D2D resource pool for D2D communication.
Figure 8:
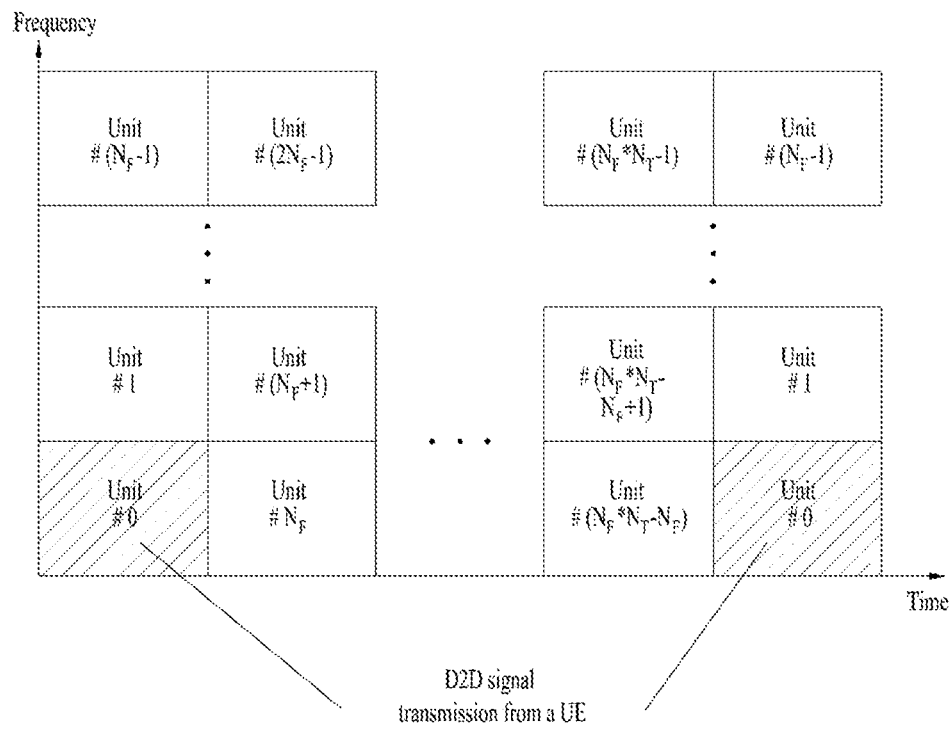

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the NF number of resource units and the entire time resources are divided into the $N_T$ number of resource units. In particular, it is able to define NF*$N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 9:
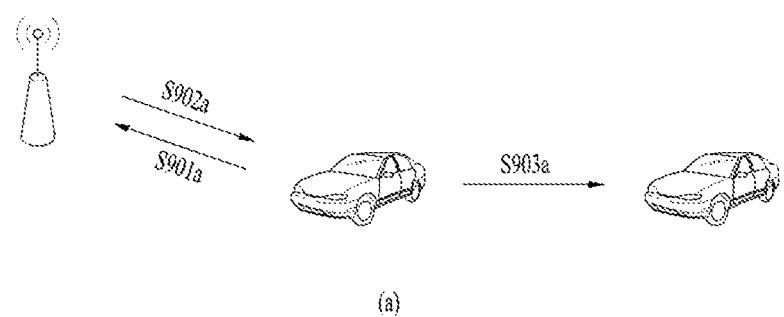
FIG. 9 is a view referred to for describing transmission modes and scheduling schemes for vehicle-to-everything (V2X)
Figure 9:
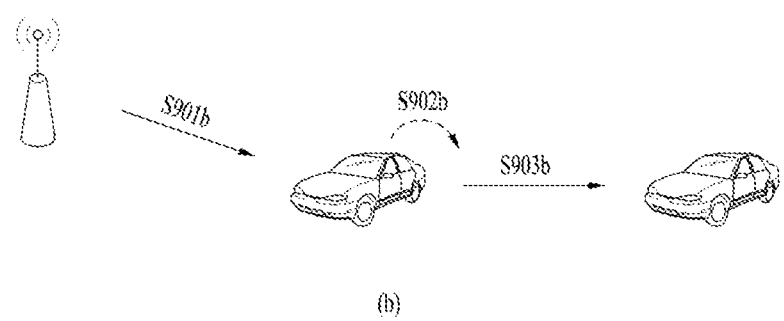
Figure 10:
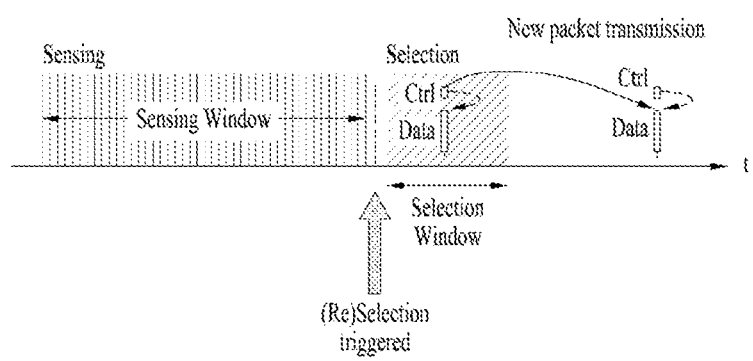
FIG. 10 is a view illustrating a method of selecting resources in V2X.
Figure 11:
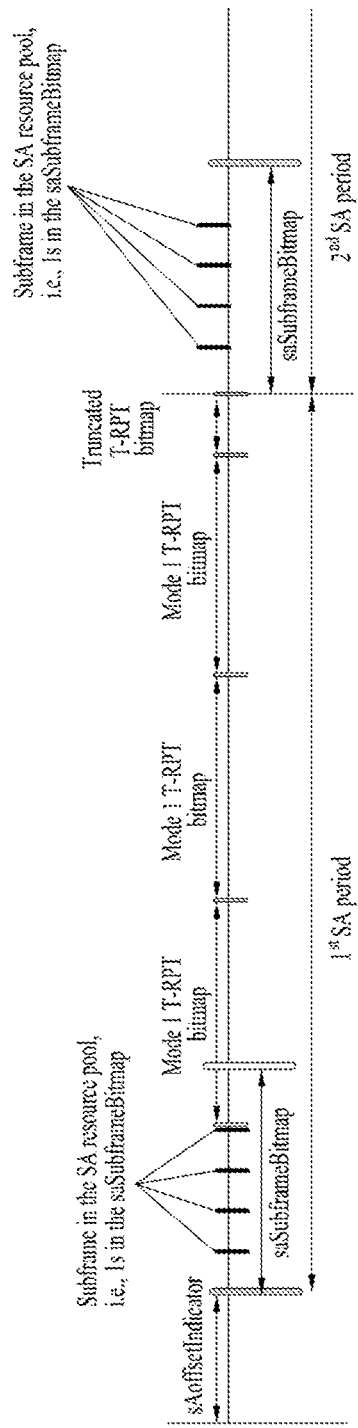
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each medium access control (MAC) protocol data unit (PDU) is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Figure 12:
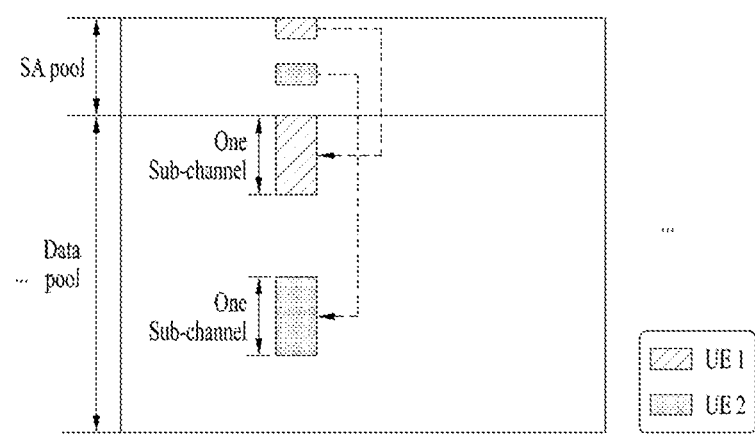
FIG. 12 is a view referred to for describing an SA and data transmission in V2X.
Figure 12:
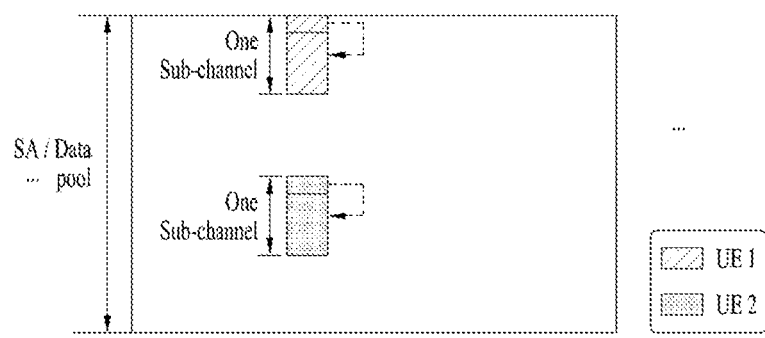

Unlike D2D, an SA (PSCCH) and data (PSSCH) are transmitted in FDM in V2X, that is, sidelink transmission mode 3 or 4. Because latency reduction is a significant factor in V2X in view of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
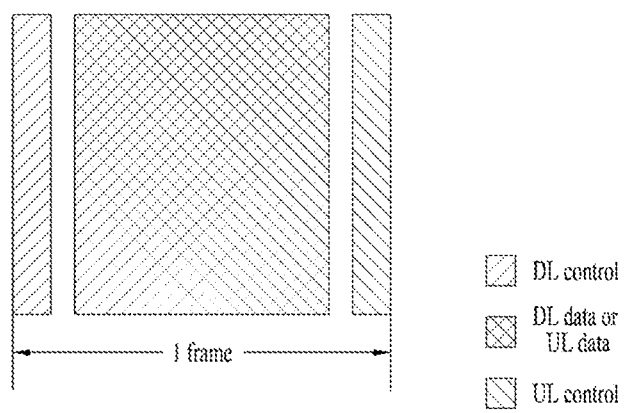
FIGS. 13 and 14 are views illustrating a new radio access technology (NRAT) frame structure.
Figure 14:
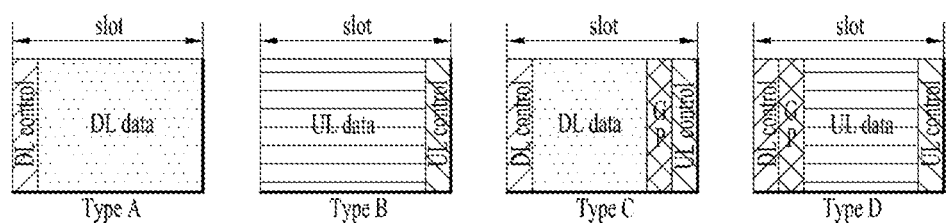
Figure 15:
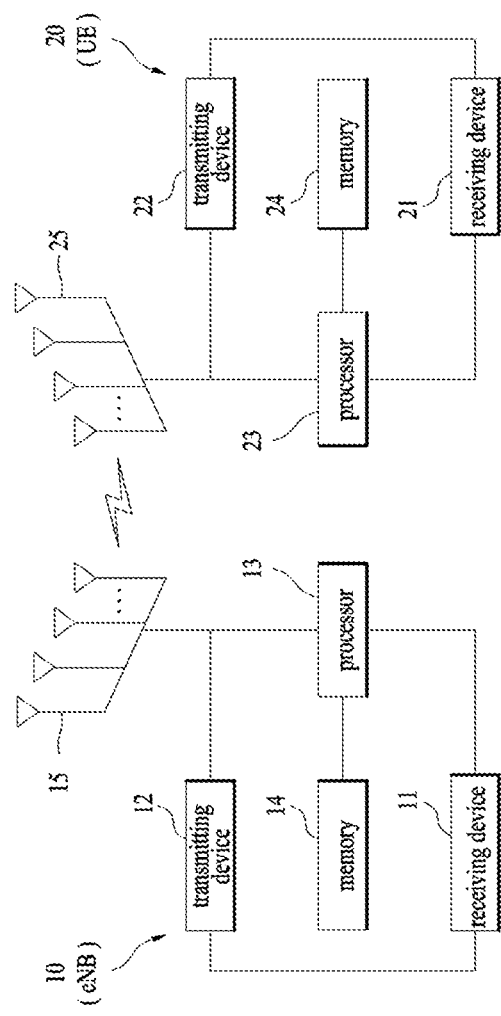
FIG. 15 is a block diagram illustrating a transmitting device and a receiving device.

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI, (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

In a legacy cellular network, a data transmission entity (an eNB or a transmitting UE) explicitly indicates a subframe which will carry an ACK/NACK or CSI feedback by a control signal or implicitly indicates the subframe (based on a specific relationship between a data transmission subframe and a feedback subframe (e.g., when data is received in subframe n, a feedback for the data is transmitted in subframe n+4)). Because this feedback method gives no regard to data transmission of a UE that transmits a feedback, the UE transmits data in no conjunction with a feedback subframe.

However, when the UE selects new transmission resources to transmit an ACK/NACK (A/N) or CSI, the UE may face packet reception ratio (PRR) reduction due to a half-duplex problem (failure in receiving another signal during transmission of a signal). A higher frequency band leads to a narrower antenna spacing, which makes it difficult to perform simultaneous transmission and reception due to interference, unless a special self-interference cancellation technique is used. Particularly on a sidelink, an additional transmission simultaneous with a feedback results in failure in receiving data in the same subframe and hence a decrease in a data reception rate. Moreover, in V2X communication characterized by at least two repeated transmissions of the same packet, once resources are selected, the resources are used repeatedly. Therefore, the problem may become more serious because signals from other UEs are not received repeatedly in the resources. In this context, simultaneous transmission of a feedback and data may mitigate the half-duplex problem, rather than use of separate time resources (e.g., subframes) for the feedback and the data transmission. In other words, a UE that transmits a feedback should be allowed to select time resources for the feedback. For example, the UE may transmit the feedback in alignment with a data transmission timing or the timing of transmitting a feedback for another packet.

When a feedback such as an A/N or CSI is transmitted in D2D communication or sidelink communication, a method of mitigating PRR reduction is proposed below. While the following description is given in the context of D2D communication, the same thing is applicable to communication between an eNB and a UE. In the following description, feedback information may include all or a part of ACK/NACK information, short-term or long-term CSI, measurement information, information indicating whether resources have collided, information indicating whether resources have been changed/reselected, and a decoding failure probability, for a received packet.

Embodiment

A UE may receive signals from a plurality of other UEs and transmit feedback information for each of at least a part of the received signals. The feedback information may be transmitted together with data of the feedback-transmitting UE. That is, the UE may autonomously determine feedback resources according to a later-described latency requirement or an indicated maximum feedback latency, and transmit the feedback and the data at the same time in a corresponding time unit (e.g., subframe, slot, or the like).

Each of the at least part of the signals may be a signal for which the UE may determine to transmit a feedback. Alternatively, each of the at least part of the signals may be a signal for which a feedback is requested by a specific field of the received signal.

Further, the feedback information may include time information by which the UE transmitting the signal may identify that the feedback information is for the transmitted signal. Specifically, the time information may indicate how many preceding time units the signal was transmitted from a time unit in which the feedback information is transmitted. That is, the feedback information may include information indicating a subframe in which data related to the feedback information was received, for example, information represented as an offset from a subframe in which the feedback is transmitted. In this method, a receiver determines time resources which carry a feedback and, along with feedback information, indicates a data packet for which the feedback information is transmitted and a transmitter which transmitted the data packet.

When two or more UEs transmit signals in the same time unit, the transmitting UEs may not be identified simply by information indicating a subframe carrying data for which feedback information is transmitted. Accordingly, when two or more of the plurality of UEs transmit signals in different layers at an overlapped time to the UE, feedback information for the signals may include information related to IDs of the two or more UEs or IDs of packets (or HARQ process IDs). The ID-related information may be included in the signals transmitted by the two or more UEs. Specifically, a UE which transmits data may transmit a predetermined bit field in some area of a control signal or a data signal or in a CRC masking bit, and a feedback-transmitting UE may transmit the whole or part of the bit field in feedback information. This bit field may be derived from the ID of the data-transmitting UE or the ID of a packet (or an HARQ process ID). Alternatively, the whole or part of the bit field may be randomly generated at each data transmission. Alternatively, each packet may have a unique ID, and the whole or part of the bit field may be derived from the ID of a packet. In another example, to indicate data for which a feedback is transmitted, information about frequency resources (e.g., the starting and/or ending index of a subchannel) used for transmission of the data may be included in the feedback information.

As such, the UE transmits a collection of feedbacks for at least part of received multiple signals, along with data. Therefore, a feedback transmission operation may be simplified as much as possible, thereby preventing a PRR decrease.

A time unit carrying feedback information may be located within a maximum latency requirement from a time unit carrying a signal for which the feedback information is transmitted. That is, a specific UE transmits a feedback signal and a data signal together by limiting the feedback signal to a message received within a predetermined time from transmission resources carrying the data signal.

It may be regulated that a feedback signal is transmitted only in a subframe within a predetermined time from a subframe in which a transmitting UE has transmitted data. This is because the transmitting UE does not have knowledge of a time at which feedback information will be transmitted, and when the transmitting UE receives the feedback information too much time later, the feedback information is useless. The size of a maximum time offset at which a feedback signal may be delivered may be set differently according to the type of a packet. Further, the maximum time offset may be set differently according to the latency requirement of the packet, indicated by a transmitting UE, or set differently according to a retransmission number.

Latency requirements for packet types or maximum feedback latencies for received packet types may be preset, determined by the network, or signaled to neighbor UEs by physical-layer signaling or higher-layer signaling from a transmitting UE. The latency requirements or maximum feedback latencies for packet types may be signaled to a UE by physical-layer signaling or higher-layer signaling from the network. For example, latency budget a for packet type #1 and latency budget b for packet type #2 may be preset. A latency budget may be represented as an allowed maximum time for transmitting a feedback. A transmitting UE may signal an allowed maximum time (maximum feedback latency) to transmit a feedback for a current transmission packet to neighbor UEs by physical-layer signaling or higher-layer signaling. For example, the allowed maximum time for transmitting the feedback signal for the transmission packet may be indicated by a control signal (e.g., a PSCCH or a MAC control element (CE)).

For feedback for a broadcast packet, the UE may transmit a feedback for multiple broadcast packets. The UE may selectively transmit a feedback only for a specific one of the broadcast packets, or may select part of feedback resources linked to a specific broadcast packet and transmit a feedback and data in the selected feedback resources.

Exceptionally, a UE that performs feedback may select specific time resources and transmit a feedback in the selected time resources, without its data transmission. This operation may be performed restrictively only for a very important or urgent packet. For this purpose, a packet type for which this restrictive operation is to be performed may be preset, or the network may signal a packet condition triggering this operation to UEs by physical-layer signaling or higher-layer signaling. For example, when a packet has a specific priority level or higher, a receiving UE may transmit a feedback for the packet irrespective of its data transmission. In another example, for a packet with a reliability requirement equal to or stricter than a predetermined level, a UE may transmit feedback information within a predetermined required latency. In another example, a packet-transmitting UE may transmit a signal requesting a feedback within a predetermined time to a receiving UE, and the receiving UE may transmit a feedback signal within the predetermined time.

In another example, a UE performing feedback may transmit data and a feedback only in a predetermined subframe or subframe group with respect to a subframe in which the UE has received data. To allow the UE to select transmission resources, multiple feedback transmission subframes may be linked to one data reception subframe, and the UE may select one of the linked subframes and transmit the feedback in the selected subframe. To indicate received data for which the feedback is transmitted, the UE may transmit the whole or part of the above-described information in the feedback signal. This method restricts resource selection to feedback subframes for a data reception.

The UE that performs feedback may receive data in multiple subframes and select a feedback subframe from among them, for data transmission. That is, although multiple subframes are available for a feedback, the UE may not have enough transmission data. Therefore, the UE transmits the feedback and data only in some subframe selected from among the multiple subframes.

In sidelink communication, feedback subframes may be semi-statically configured separately from data transmission subframes. For example, an $n^{th}$ subframe within a predetermined time period may be configured as a feedback subframe and thus carry a feedback for previously received data. In another example, a predetermined OFDM symbol of a specific subframe may be configured as a time resource period for a feedback. This feedback subframe may appear every predetermined period, and the specific positions and periodicity of feedback subframes may be preconfigured or configured by the network. This method separates data transmission subframes from feedback subframes, for feedback, thereby preventing the decrease of a data reception rate.

When the UE intends to transmit feedbacks together for packets received from multiple UEs at a specific time as described above, the feedbacks may be transmitted by a physical-layer signal (e.g., PUCCH) or a higher-layer signal (e.g., a MAC CE or payload). Each field may be preconfigured or adaptively configured by the feedback-transmitting UE. For example, the number of bits in a field configured for a feedback for each packet may be indicated by a MAC header. When the feedbacks are transmitted in a physical-layer signal, how the field for each packet is configured may be preset. The field for each packet may include resource information about a UE or a packet, the ID of the UE or the packet, an ACK/NACK, or the like.

The above description may be used in uplink or downlink, not limited to direct communication between UEs, and a BS or a relay node may also use the proposed method.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by an eNB, or is requested to a receiving UE or a transmitting UE by the transmitting UE or the receiving UE.

Apparatus Configurations According to Embodiment of the Present Disclosure

FIG. 16 is a block diagram of a transmission point and a UE according to an embodiment of the present disclosure.

Referring to FIG. 16, a transmission point 10 according to the present disclosure may include a receiving device 11, a transmitting device 12, a processor 13, a memory 14, and a plurality of antennas 15. Use of the plurality of antennas 15 means that the transmission point 10 supports MIMO transmission and reception. The receiving device 11 may receive various UL signals, data, and information from a UE. The transmitting device 12 may transmit various DL signals, data, and information to a UE. The processor 13 may provide overall control to the transmission point 10.

The processor 13 of the transmission point 10 according to an embodiment of the present disclosure may process requirements for each of the foregoing embodiments.

The processor 13 of the transmission point 10 may function to compute and process information received by the transmission point 10 and information to be transmitted to the outside. The memory 14 may store the computed and processed information for a predetermined time, and may be replaced by a component such as a buffer (not shown).

With continued reference to FIG. 16, a UE 20 according to the present disclosure may include a receiving device 21, a transmitting device 22, a processor 23, a memory 24, and a plurality of antennas 15. Use of the plurality of antennas 25 means that the UE 20 supports MIMO transmission and reception. The receiving device 21 may receive various DL signals, data, and information from an eNB. The transmitting device 22 may transmit various UL signals, data, and information to an eNB. The processor 23 may provide overall control to the UE 20.

The processor 23 of the UE 20 may process requirements for each of the afore-described embodiments. Specifically, the processor 23 receives signals from a plurality of UEs and transmits feedback information for each of at least a part of the received signals. The feedback information is transmitted along with data of the UE transmitting the feedback information. The feedback information includes time information based on which UEs transmitting the at least part of the signals identify that the feedback information is for the signals transmitted by the UEs. Besides, the processor 23 of the UE 20 functions to compute and process information received by the UE 20 and information to be transmitted to the outside. The memory 24 may store the computed and processed information for a predetermined time and may be replaced with a component such as a buffer (not shown).

The specific configuration of the transmission point and the UE may be implemented such that the details described in the various embodiments of the present disclosure may be applied independently or implemented such that two or more of the embodiments are applied at the same time. For clarity, a redundant description is omitted.

In the example of FIG. 16, the description of the transmission point 10 may also be applied to a relay as a DL transmission entity or a UL reception entity, and the description of the UE 20 may also be applied to a relay as a DL reception entity or a UL transmission entity.

The embodiments of the present disclosure may be implemented through various means, for example, in hardware, firmware, software, or a combination thereof.

In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method performed by a second user equipment (UE) in a wireless communication system, the method comprising:
   receiving, by the second UE from a base station, a higher layer signaling related to a feedback information,
   receiving, by the second UE from a first UE, a Physical sidelink control channel (PSCCH),
   receiving, by the second UE from the first UE, a first Physical Sidelink Shared Channel (PSSCH); and
   transmitting, by the second UE to the first UE, a feedback information including a Hybrid Automatic Repeat Request (HARQ) acknowledgment/negative acknowledgment (ACK/NACK) for the first PSSCH, based on the higher layer signaling and the PSCCH,
   wherein based on that a reception of a second PSSCH is not performed due to a half duplex operation, the feedback information includes an information related to a resource reselection with the HARQ ACK/NACK.

2. The method according to claim 1, wherein based on the half duplex operation, the reception of the second PSSCH is not performed due to the transmission of the feedback information.

3. The method according to claim 1, wherein based on the first PSSCH being related to a request for sidelink CSI feedback, a resource in which the feedback information is transmitted is selected within a latency bound.

4. The method according to claim 3, wherein the latency bound is received via a higher layer signaling from the second UE.

5. A second user equipment (UE) configured to operate in a wireless communication system, the second UE comprising:
   a transceiver; and
   a processor,
   wherein the processor is configured to receive, from a base station, a higher layer signaling related to a feedback information, receive, from a first UE, Physical sidelink control channel (PSCCH), receive, from the first UE, a first Physical Sidelink Shared Channel (PSSCH); and transmit, to the first UE, a feedback information including a Hybrid Automatic Repeat Request (HARQ) acknowledgment/negative acknowledgment (ACK/NACK) for the first PSSCH, based on the higher layer signaling and the PSCCH,
   wherein based on that a reception of a second PSSCH is not performed due to a half duplex operation, the feedback information includes an information related to a resource reselection with the HARQ ACK/NACK.

6. The second UE according to claim 5, wherein a resource in which the feedback information is transmitted is located after a preconfigured offset value from a resource in which the first PSSCH is received.

7. The second UE according to claim 5, wherein based on the first PSSCH being related to a request for sidelink CSI feedback, a resource in which the feedback information is transmitted is selected within a latency bound.

8. The second UE according to claim 7, the latency bound is received via a higher layer signaling from the second UE.

* * * * *